United States Patent
Kweon et al.

(10) Patent No.: US 8,848,134 B2
(45) Date of Patent: Sep. 30, 2014

(54) LED ASSEMBLY AND LIQUID CRYSTAL DISPLAY DEVICE INCLUDING THE SAME

(75) Inventors: Young-Min Kweon, Gumi-si (KR); Myoung-Ki Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 211 days.

(21) Appl. No.: 12/976,450

(22) Filed: Dec. 22, 2010

(65) Prior Publication Data

US 2012/0092581 A1   Apr. 19, 2012

(30) Foreign Application Priority Data

Oct. 13, 2010   (KR) .................. 10-2010-0099951

(51) Int. Cl.
G02F 1/1335 (2006.01)
F21V 8/00 (2006.01)

(52) U.S. Cl.
CPC ............ *G02B 6/0083* (2013.01); *G02B 6/0073* (2013.01); *G02B 6/0068* (2013.01)
USPC ............................................. 349/65; 349/61

(58) Field of Classification Search
USPC ...................... 349/61–71, 149–152
See application file for complete search history.

(56) References Cited

U.S. PATENT DOCUMENTS 7,597,468 B2 * 10/2009 Weng et al. ............... 349/65
8,247,975 B2 * 8/2012 Yoo et al. .................. 349/69

FOREIGN PATENT DOCUMENTS

| CN | 101852945 | 10/2010 |
| JP | 2009-110825 | 5/2009 |
| JP | 2010-062016 | 3/2010 |

* cited by examiner

*Primary Examiner* — Dung Nguyen
(74) *Attorney, Agent, or Firm* — McKenna, Long & Aldridge LLP

(57) ABSTRACT

A light emitting diode (LED) assembly includes a printed circuit board; first and second LED arrays arranged on the printed circuit board and each including a plurality of LEDs, wherein the LEDs in each of the first and second LED array are connected to each other in series, and an output terminal of the first LED array faces an output terminal of the second LED array; a first input line connected to an input terminal of the first LED array; a second input line connected to an input terminal of the second LED array; and one output line connected to the output terminal of the first LED array and the output terminal of the second LED array, wherein the first input line, the second input line and the one output line are disposed at one side of the printed circuit board with respect to the LEDs.

19 Claims, 3 Drawing Sheets

LED ASSEMBLY AND LIQUID CRYSTAL DISPLAY DEVICE INCLUDING THE SAME

The present application claims the benefit of Korean Patent Application No. 10-2010-0099951 filed in Korea on Oct. 13, 2010, which is hereby incorporated by reference for all purposes as if fully set forth herein.

BACKGROUND OF THE INVENTION

1. Field of the Invention

The present invention relates to a liquid crystal display (LCD) device and more particularly to a light emitting diode (LED) assembly having a small size and an LCD device having a thin profile.

2. Discussion of the Related Art

The LCD device, which uses an optical anisotropy and a polarization property to display an image, is widely used for notebook computers, monitors, TV, and so on, because of their high contrast ratio and characteristics adequate to display moving images.

The LCD device includes a liquid crystal panel having a first substrate, a second substrate and a liquid crystal layer. The first and second substrates face each other, and the liquid crystal layer is interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel.

FIG. 1 is a cross-sectional view of the related art LCD device. In FIG. 1, the LCD device includes a liquid crystal panel 10, a backlight unit 20, a main frame 30, a top frame 40 and a bottom frame 50.

The liquid crystal panel 10 includes a first substrate 12, a second substrate 14 and a liquid crystal layer (not shown). The first and second substrates 12 and 14 face each other, and the liquid crystal layer is interposed therebetween. First and second polarization plates 19a and 19b is disposed on opposite sides of the liquid crystal panel 10.

The backlight unit 20 is disposed under the liquid crystal panel 10. The backlight unit 20 includes a light source 29, a reflective sheet 25, a light guide plate 23 and an optical sheet 21. The light source 29 is arranged along at least one side of the main frame 30. The reflective sheet 25 is disposed on the bottom frame 50 and has a color of white or silver. The light guide plate 25 is disposed on the reflective sheet 25, and the optical sheet 21 is disposed on or over the light guide plate 23.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

One of a cold cathode fluorescent lamp (CCFL), an external electrode fluorescent lamp and an LED is used as a light source 29 of the backlight unit 20. Among these light sources, the LED is widely used because of their characteristics, for example, small size, low power consumption, and so on.

As shown in FIG. 1, the LED 29a is arranged on a printed circuit board (PCB) 29b to form the light source 29. The light source 29 including the LED 29a may be referred to as an LED assembly. The light emitted from at least one LED assembly 29 is provided into the light guide plate 23. The light is processed into a plane light source having a uniform brightness through the light guide plate 23, the reflective sheet 25 and the optical sheet 21, and provided into the liquid crystal panel 10.

FIG. 2 schematically shows the related art LED assembly. As shown in FIG. 2, a plurality of LEDs 29a are arranged on a PCB 29b, and input lines 27a and output lines 27b are formed on the PCB 29b. In addition, a plurality of pads 28 are formed at one end of the PCB 29b. The input lines 27a and the output lines 27b are electrically connected to an LED driving circuit (not shown) to drive the LEDs 29a.

There are some problems in the related art LCD device and the LED assembly. More LEDs 29a are required as a size of the LCD device is increased. For example, LEDs more than several hundreds are used for an LCD device of 42 inches. In this case, it is very difficult to supply a driving voltage with all LEDs connected in series. Accordingly, some LEDs form one array, and the LEDs in one array are electrically connected in series. As a result, the plurality of pads 28 should be formed on the PCB 29b as shown in FIG. 2.

To avoid an electrical short and an electrical interference, the input lines 27a are disposed one side of the PCB 29b and the output lines 27b are disposed another side of the PCB 29b. Namely, as shown in FIG. 2, the input lines 27a are disposed at an upper side of the LEDs 29a, and the output lines 27b are disposed at a lower side of the LEDs 29a. As a result, the LEDs 29a are positioned at a center line of the PCB 29b.

On the other hand, since the LEDs 29a should correspond to a center of the light guide plate 23 as shown in FIG. 1, a lower side of the PCB 29b protrudes than the light guide plate 23 or the reflective sheet 25. As a result, a protruding portion "A" is required in the bottom frame 50 to cover the lower side of the PCB 29b such that a thickness "d1" of the LCD device is increased. Particularly, since the input lines 27a and the output lines 27b should be disposed at opposite sides of the PCB 29b, the PCB 29b has a width "d'1" of about 6.0~8.0 mm.

When the width "d'1" of the PCB 29b is increased, the thickness "d1" of the LCD device is also increased. In addition, a weight of the LCD device is increased.

Recently, a method of connecting the input lines and the output lines through via holes is introduced. Unfortunately, since the PCB requires a plurality of layers, weight of the PCB is rapidly increased. Accordingly, new LED assembly having advantages on the width as well as the weight is required.

SUMMARY OF THE INVENTION

Accordingly, the present invention is directed to an LED assembly and an LCD device including the same that substantially obviate one or more of the problems due to limitations and disadvantages of the related art.

An object of the present invention is to decrease a number of input lines and output lines of a PCB for an LED assembly.

Another object of the present invention is to provide an LCD device having a reduced thickness and weight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a light emitting diode (LED) assembly includes a printed circuit board; first and second LED arrays arranged on the printed circuit board and each including a plurality of LEDs, wherein the LEDs in each of the first and second LED array are connected to each other in series, and an output terminal of the first LED array faces an output terminal of the second LED array; a first input line connected to an input terminal of the first LED array; a second input line connected to an input terminal of the second LED array; and one output line connected to the output terminal of the first LED array and the output terminal of the second LED array, wherein the first input line, the second input line and the one output line are disposed at one side of the printed circuit board with respect to the LEDs.

In another aspect, a liquid crystal display device includes a liquid crystal panel; a backlight unit for projecting light on the liquid crystal panel and including a light emitting diode (LED) assembly, the LED assembly including: a printed circuit board; first and second LED arrays arranged on the printed circuit board and each including a plurality of LEDs, wherein the LEDs in each of the first and second LED array are connected to each other in series, and an output terminal of the first LED array faces an output terminal of the second LED array; a first input line connected to an input terminal of the first LED array; a second input line connected to an input terminal of the second LED array; and one output line connected to the output terminal of the first LED array and the output terminal of the second LED array, a bottom frame under the backlight unit; a main frame surrounding the liquid crystal panel; and a top frame surrounding an edge of the liquid crystal panel, wherein the first input line, the second input line and the one output line are disposed at one side of the printed circuit board with respect to the LEDs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 3:
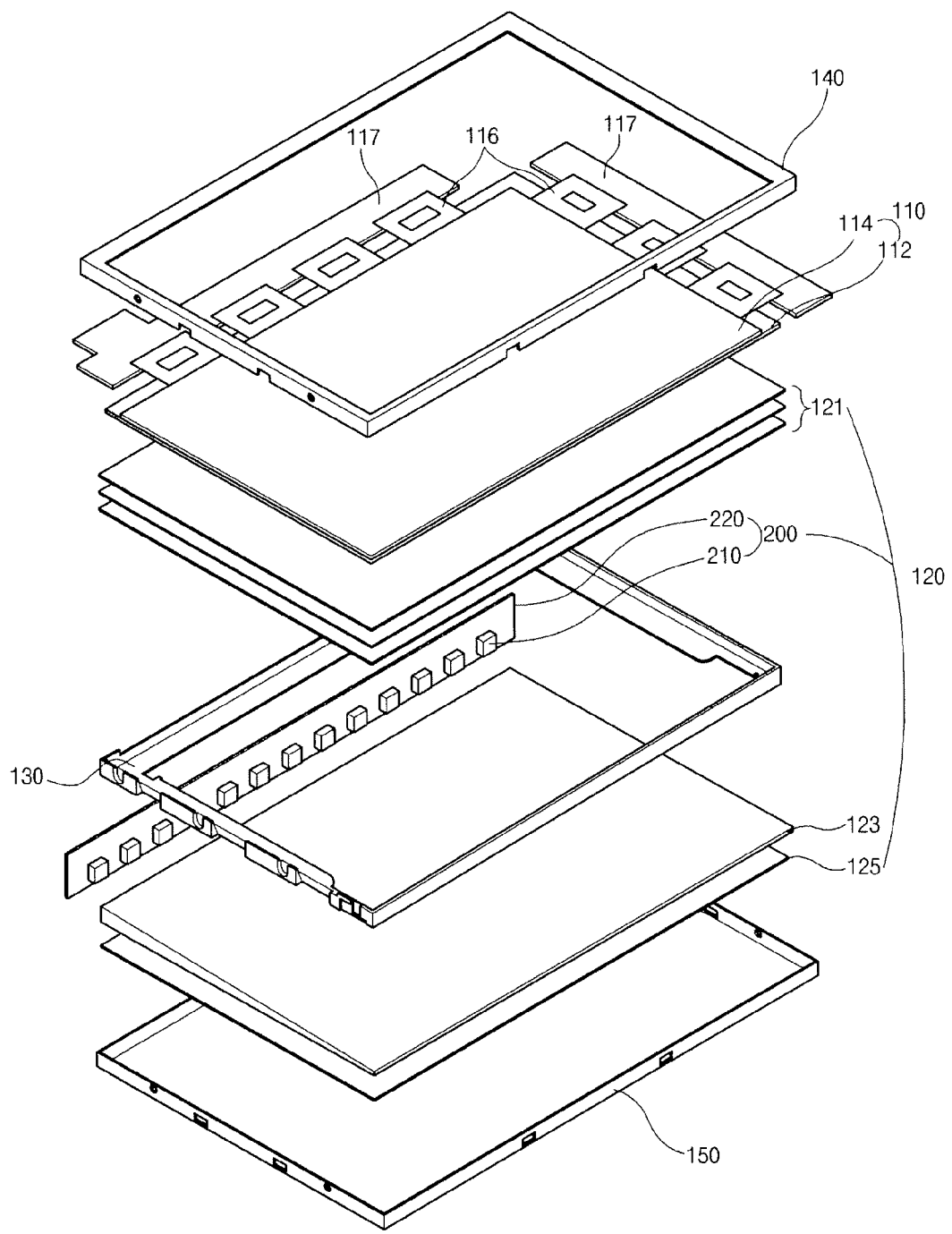
FIG. 3 is an exploded perspective view of an LCD device according to the present invention.

FIG. 3 is an exploded perspective view of an LCD device according to the present invention. As shown in FIG. 3, the LCD device includes a liquid crystal panel 110, a backlight unit 120, a main frame 130, a top frame 140 and a bottom frame 150.

The liquid crystal panel 110 includes a first substrate 112, a second substrate 114 and a liquid crystal layer (not shown). The first and second substrates 112 and 114 face each other, and the liquid crystal layer is interposed therebetween. First and second polarization plates 119a and 119b is disposed on opposite sides of the liquid crystal panel 110.

When the liquid crystal panel 110 is an active matrix type, a gate line (not shown) and a data line (not shown) are formed on the first substrate 112. The gate and data lines cross each other to define a pixel region. A thin film transistor (TFT) (not shown) is formed at a crossing portion of the gate and data lines. A pixel electrode (not shown) is formed in each pixel region and connected to the TFT. The first substrate 112 may be referred to as an array substrate.

On the second substrate 114, a black matrix (not shown) having an opening, which corresponding to the pixel region, is formed. A color filter layer including red, green and blue sub-color filters is formed in the opening. A common electrode is formed on the color filter layer. The second substrate 114 may be referred to as a color filter substrate.

The liquid crystal panel 110 is connected to gate and data printed circuit boards (PCBs) 117 through a connection member 116, for example, a flexible circuit board or a tape carrier package, that provide a scanning signal and an image signal to the liquid crystal panel 110, respectively. The printed circuit board 117 extends along end portions of a side surface of the main frame 130 or a rear surface of a bottom frame 150, respectively, as dummy spaces in a modulation process. When the TFT is turned on by a scanning signal form a gate driving circuit, an image signal is applied to the pixel electrode. Then, the liquid crystal layer is driven by an electric field generated between the pixel and common electrodes. As a result, light transmissivity of the liquid crystal layer is controlled such that the LCD device can produce an image.

Although not shown, an orientation film for determining an initial arrangement of liquid crystal molecules is disposed between the first substrate 112 and the liquid crystal layer and between the second substrate 114 and the liquid crystal layer. In addition, a seal pattern preventing leakage of liquid crystal molecules is formed along an edge of one of the first and second substrates 112 and 114, and first and second polarization plates are formed at an outer side of the first and second substrates 112 and 114, respectively.

The backlight unit 120 for providing light onto the liquid crystal panel 110 is disposed under the liquid crystal panel 110. The backlight unit 120 includes an LED assembly 200 and an optical member for improving a light property. The optical member may include a reflective sheet 125, a light guide plate 123 and an optical sheet 121. The LED assembly 200 is disposed at a side of the light guide plate 123 and includes a plurality of LEDs 210, a PCB 220, where the LEDs 210 are arranged. The light guide plate 123 is disposed on the reflective sheet 125, and the optical sheet 121 is disposed on the light guide plate 123.

In the LED assembly 200, some of the LEDs 210 form an LED array. Namely, a plurality of LED arrays are arranged on the PCB 220. The LEDs 200 in the LED array are connected to each other in series, while the LED arrays are connected to each other in parallel. In the LED assembly 200 of the present invention, input lines (not shown) and output lines (not shown), which supplies a positive voltage and a ground voltage, respectively, are disposed at one side of the PCB 220.

In the LED assembly 220 of the present invention, an output terminal (not shown) of one LED array faces an output terminal (not shown) of adjacent LED array. Namely, when first and second LED arrays, each of which includes a plurality of LEDs 210, form a pair of LED arrays, the output terminal of the LEDs in the first LED array faces the output terminal of the LEDs in the second LED array. Accordingly, one output line is required for two LED arrays. As a result, the output lines and the input lines for the LEDs 210 can be disposed at one side of the PCB 220 such that a width of the PCB 220 can be reduced. In addition, the LEDs 210 can be disposed at the other side of PCB 220, there is no protruding portion "A" (of FIG. 1) in the bottom frame 50 (of FIG. 1) such that a thickness of the LCD device is reduced.

The light from the LED 210 is processed into a plane light source during passing through the light guide plate 123 by a total reflection. The light guide plate 123 may have a pattern for guiding the light to the liquid crystal panel 110 and providing an uniform plane light source. For example, the pattern may be an elliptical pattern, a polygon pattern, a hologram pattern and may be formed at a bottom surface of the light guide plate 123.

The reflective sheet 125 is disposed under the light guide plate 123. The light is reflected on the reflective sheet to improve an optical efficiency. The optical sheet 121 on or over the light guide plate 123 includes a diffusion sheet and at least one concentrating sheet. The light, which passes through the light guide plate 123, is diffused and/or concentrated such that an uniform plane light is provided onto the liquid crystal panel 110.

The liquid crystal display panel 110 and the backlight unit 120 are combined using the main frame 130 that can prevent movement of the liquid crystal panel 110 and the backlight unit 120. The main frame 130 surrounds sides of the liquid crystal panel 110. The top frame 140 covers edges of the liquid crystal panel 10 and sides of the main frame 130, so the top frame 140 can support and protect of the edges of the liquid crystal panel 110 and sides of the main frame 130. The top frame 140 has an opening such that images from the liquid crystal panel 110 are displayed through the opening. The bottom frame 150 covers back edges of the main frame 130, so the bottom frame 150 is combined with the main frame 130 and the top frame 140 for modulation.

Figure 4:
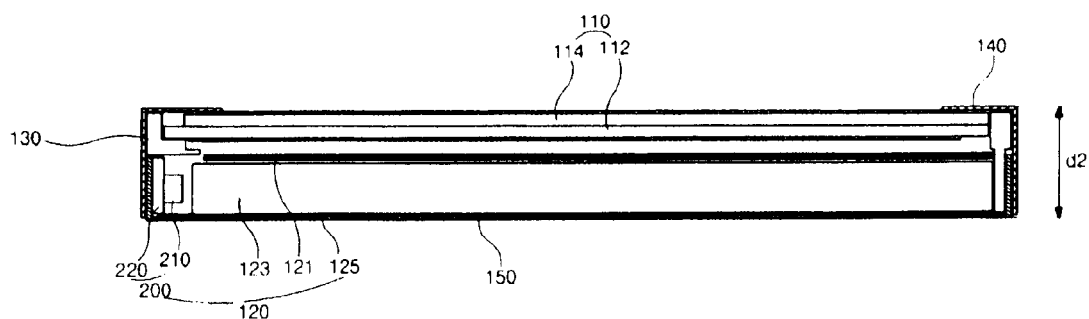
FIG. 4 is a cross-sectional view of an LED device according to the present invention.

FIG. 4 is a cross-sectional view of an LED device according to the present invention. As shown in FIG. 4, a thickness "d2" of the LCD device according to the present invention is smaller than the thickness "d1" of the related art LCD device in FIG. 1. It is because the bottom frame 150 does not require the protruding portion "A" (of FIG. 1) for the PCB 220.

Figure 1:
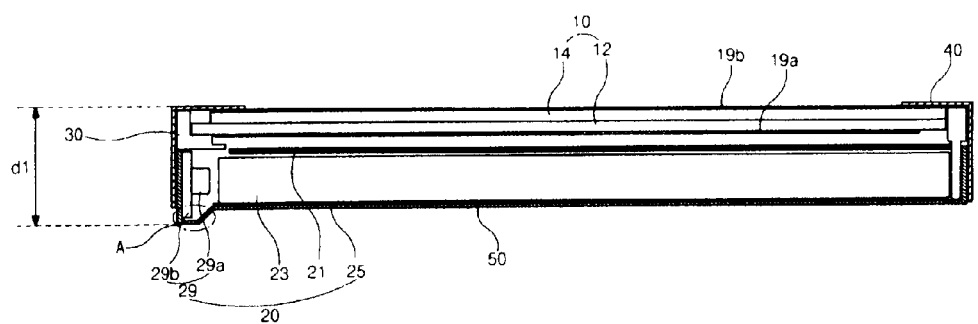
FIG. 1 is a cross-sectional view of the related art LCD device.
Figure 2:
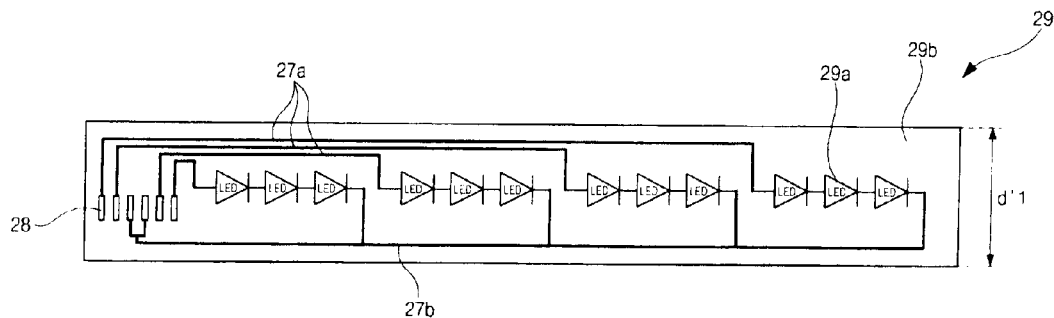
FIG. 2 schematically shows the related art LED assembly.

Namely, referring to FIGS. 1 and 2, in the related art LCD device, since the input lines 27a and the output lines 27b are disposed at one side and the other side of the PCB 29b, respectively, and the LED 29a at a center of the PCB 29b should face the light guide plate 23, the bottom frame 50 should include the protruding portion "A" for covering a lower end of the PCB 29b. As a result, a thickness "d1" of the LCD device is increased. However, in the LCD device according to the present invention, both the input line and the output line are disposed at one side of the PCB 220 and the LED 210 is disposed at the other side of the PCB 220, the bottom frame 150 does not require the protruding portion "A" (of FIG. 1). Namely, a lower end of the PCB 220 has substantially the same horizontal position with a lower end of the light guide plate 123. As a result, the thickness "d2" of the LCD device according to the present invention is reduced with compared to the thickness "d1" of the related art LCD device. (d1>d2)

Figure 5:
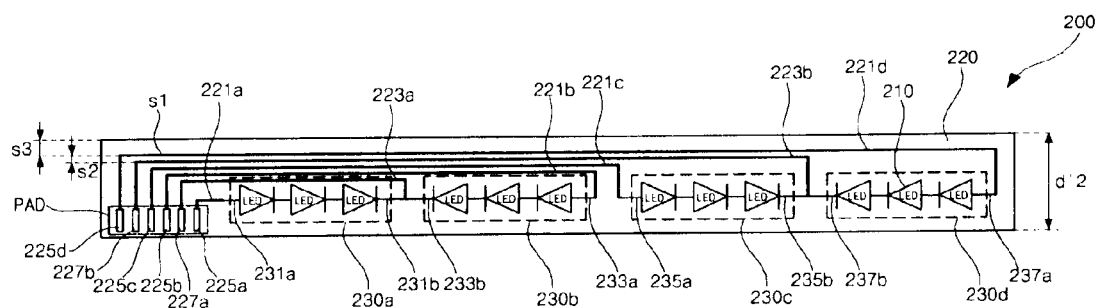
FIG. 5 schematically shows an LED assembly according to the present invention.

FIG. 5 schematically shows an LED assembly according to the present invention. As shown in FIG. 5, the LED assembly 200 includes a plurality of LEDs 210 and a PCB 220. The plurality of LEDs 210 are arranged on the PCB 220 using a surface mount technology (SMT). The LEDs 210 may be spaced apart from each other by a pre-determined distance.

One LED 210 emits red light, another one LED 210 emits green light, and the other one LED 210 emits blue light. The LEDs 129a are connected to a power line (not shown) on the PCB 220 in parallel and simultaneously turned on and off such that white light is provided by mixing red, green and blue lights. On the other hand, each LED 210 may emit white light.

The PCB 220 includes a power line layer (not shown), which includes first to fourth input lines 221a, 221b, 221c and 221d and first and second output lines 223a and 223b, an insulating layer (not shown), and a PCB base layer (not shown). Heat from the LED 210 emits to an outer space through the PCB base layer. For example, the PCB base layer may be formed of a high thermal conductivity such as aluminum (Al) or copper (Cu). In addition, a heat-sink (not shown) is provided at a rear surface to increase a heat-radiation. The insulating layer is formed on the PCB base layer, and the input lines 221a, 221b, 221c and 221d and the output lines 223a and 223b are formed on the insulating layer.

An input terminal of the LED 210 is connected to one of the input lines 221a, 221b, 221c and 221d, and an output terminal of the LED 210 is connected to one of the output lines 223a and 223b. A pad portion "PAD" is disposed at one end of the input lines 221a, 221b, 221c and 221d and the output lines 223a and 223b and includes first to fourth input pads 225a, 225b, 225c and 225d and first and second output pads 227a and 227b. The first to fourth input pads 225a, 225b, 225c and 225d are connected to the first to fourth input lines 221a, 221b, 221c and 221d, respectively, and the first and second output pads 227a and 227b are connected to the first and second output lines 223a and 223b, respectively. The LED 210 is connected to an LED driving circuit (not shown) through the input lines 221a, 221b, 221c and 221d, the output lines 223a and 223b, the input pads 225a, 225b, 225c and 225d and the output pads 227a and 227b. The input pads 225a, 225b, 225c and 225d and the output pads 227a and 227b are connected to the LED driving circuit via an additional cable (not shown). The LED 210 is controlled by the LED driving circuit to emit light.

Several LEDs 210 form an LED array. In FIG. 5, three LEDs 210 form one LED array. The LEDs 210 in each LED array are electrically connected to each other in series. Each LED array has one input terminal and one output terminal, and the LEDs in each LED array are disposed between the one input terminal and the one output terminal.

The first input line 221a is connected to a first input terminal 231a of a first LED array 230a, and the second input line 221b is connected to a second input terminal 233a of a second LED array 230b. Similarly, the third input line 221c is connected to a third input terminal 235a of a third LED array 230c, and the fourth input line 221d is connected to a fourth input terminal 237a of a fourth LED array 230d. The first output line 223a is connected to both a first output terminal 231b of the first LED array 230a and a second output terminal 233b of the second LED array 230b, and the second output line 223b is connected to both a third output terminal 235b of the third LED array 230c and a fourth output terminal 237b of the fourth LED array 230d.

When the first and second LED arrays 230a and 230b form a first LED array pair and the third and fourth LED arrays 230c and 230d form a second LED array pair, the first and second output terminals 231b and 233b in the first LED array pair face each other and the third and fourth output terminals 235b and 237b in the second LED array pair face each other.

On the other hand, the second input terminal 233a and third input terminal 235a in adjacent LED array pairs face each other. Namely, first LED array, where the LEDs 210 have an output terminal toward one direction, and second LED array, where the LEDs 210 have an output terminal toward an opposite direction, are alternately arranged with each other. As a result, the LED array pair shares the output line.

The first to fourth input lines 221a, 221b, 221c and 221d and the first and second output lines 223a and 223b are positioned at one side of the LEDs 210. In other word, the first to fourth input lines 221a, 221b, 221c and 221d and the first and second output lines 223a and 223b are positioned at one side of the PCB 220, and the LEDs 210 are positioned at the other side of the PCB 220. The first to fourth input lines 221a, 221b, 221c and 221d and the first and second output lines 223a and 223b are positioned at one side of the PCB 220 with respect to the LEDs 210. In FIG. 5, the first to fourth input lines 221a, 221b, 221c and 221d and the first and second output lines 223a and 223b are positioned at an upper side of the PCB 220, and the LEDs 210 are positioned at a lower side of the PCB 220. The first to fourth input lines 221a, 221b, 221c and 221d and the first and second output lines 223a and 223b are spaced apart from each other to avoid an electrical short.

The first to fourth input pads 225a, 225b, 225c and 225d and the first and second output pads 227a and 227b are positioned at another side of the PCB 220.

The first input terminal 231a of the first LED array 230a is connected to the first input pad 225a through the first input line 221a, and the first output terminal 231b of the first LED array 230a is connected to the first output pad 227a through the first output line 223a. The second input terminal 233a of the second LED array 230b, which is adjacent to the first LED array 230a, is connected to the second input pad 225b through the second input line 221b, and the second output terminal 233b of the second LED array 230b is connected to the first output pad 227a through the first output line 223a. Namely, the LEDs 210 in the first and second LED arrays 230a and 230b is connected to the first output pad 227a through the first output line 223a to receive a first ground voltage.

The third input terminal 235a of the third LED array 230c is connected to the third input pad 225c through the third input line 221ca, and the third output terminal 235b of the third LED array 230c is connected to the second output pad 227b through the second output line 223b. The fourth input terminal 237a of the fourth LED array 230d, which is adjacent to the third LED array 230c, is connected to the fourth input pad 225d through the fourth input line 221d, and the fourth output terminal 237b of the fourth LED array 230d is connected to the second output pad 227b through the second output line 223b. Namely, the LEDs 210 in the third and fourth LED arrays 230c and 230d is connected to the second output pad 227b through the second output line 223b to receive a second ground voltage.

As mentioned above, since the input lines 221a, 221b, 221c and 221d and the output lines 223a and 223b are positioned at one side of the PCB 220 and the LEDs 210 are positioned at the other side of the PCB 220, a lower end of the PCB 220 has substantially the same horizontal position with a lower end of the light guide plate 123. Accordingly, the bottom frame 150 does not require the protruding portion "A" (of FIG. 1) such that a thickness of the LCD device is reduced. In addition, since the input lines 221a, 221b, 221c and 221d and the output lines 223a and 223b are positioned at one side of the LEDs 210, a width "d'2" of the PCB 220 in the present invention is smaller than a width "d'1" of the PCB 29b in the related art. (d'1>d'2).

The PCB 220 has a the width "d'2" with a size of the LED 210, a width of each lines 221a, 221b, 221c, 221d, 223a and 223b and a distance between the lines 221a, 221b, 221c, 221d, 223a and 223b. A minimum width "s1" of the lines is about 0.2~0.4 mm, and a minimum distance "s2" between the lines is also about 0.2~0.4 mm. In addition, an outmost line 221d on the PCB 220 should have a distance "s3" of at least 1.0~1.1 mm from an edge of the PCB 220.

When the LEDs 210, each of which has a size of 3 mm*2 mm, and six lines 221a, 221b, 221c, 221d, 223a and 223b are arranged on the PCB 220, the width "d'2" of the PCB 220 is about 5.0~7.1 mm. ("s1"(0.2~0.4 mm)*5+"s2"(0.2~0.4 mm)*5+"s3"(1.0~1.1 mm)*1+3 mm (LED size)) Here, since the first input line 221a is disposed at a region with the LED 210, a width "d'2" of the PCB 220 does not require a space for the first input line 221a. In addition, since all of the lines 221a, 221b, 221c, 221d, 223a and 223b are positioned at one side of the PCB 220, only one distance "s3" between the outmost line and the edge of the PCB 220 is required. Consequently, the PCB 220 of the present invention has the width "d'2" smaller than the width "d'1", which is about 6.0~8.0 mm, of the related art PCB 29b (of FIG. 2). Accordingly, the PCB 220 has reduced weight and reduced production costs. In addition, a thickness "d2" of the LCD device is also reduced with the PCB 220 having a reduced width "d'2".

As mentioned above, the output terminal of the LEDs 210 in one LED array faces the output terminal of the LEDs 210 in an adjacent LED array such that all of the input lines 221a, 221b, 221c and 221d and the output lines 223a and 223b are disposed at one side of the PCB 220. As a result, a width of the PCB 220 can be reduced. In addition, the LEDs 210 can be disposed at the other side of PCB 220, there is no protruding portion "A" (of FIG. 1) in the bottom frame 50 (of FIG. 1) such that a thickness of the LCD device is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A light emitting diode (LED) assembly, comprising:
   a printed circuit board;
   first and second LED arrays arranged on the printed circuit board and each including a plurality of LEDs, wherein the LEDs in each of the first and second LED array are connected to each other in series, and an output terminal of the first LED array faces an output terminal of the second LED array such that both the output terminal of the first LED array and the output terminal of the second LED array are disposed between an input terminal of the first LED array and an input terminal of the second LED array;
   a first input line connected to an input terminal of the first LED array;
   a second input line connected to an input terminal of the second LED array; and
   one output line connected to the output terminal of the first LED array and the output terminal of the second LED array,
   wherein the first input line, the second input line and the one output line are disposed at one side of the printed circuit board with respect to the LEDs.

2. The LED assembly according to claim 1, further comprising third and fourth LED arrays arranged on the printed circuit board, wherein an output terminal of the third LED array faces an output terminal of the fourth LED array.

3. The LED assembly according to claim 2, wherein an input terminal of the third LED array face the input terminal of the second LED array.

4. The LED assembly according to claim 2, further comprising;
a third input line connected to an input terminal of the third LED array;
a fourth input line connected to an input terminal of the fourth LED array; and
another one output line connected to the output terminal of the third LED array and the output terminal of the fourth LED array.

5. The LED assembly according to claim 4, wherein the third input line, the fourth input line and the another one output line are disposed at the one side of the printed circuit board.

6. The LED assembly according to claim 4, further comprising first and second input pads on the printed circuit board and connected to the third and fourth input lines, and one output pad on the printed circuit board and connected to the another one output line.

7. The LED assembly according to claim 6, wherein each of the first and second input pads and the one output pad is connected to an LED driving circuit through a cable.

8. The LED assembly according to claim 1, further comprising first and second input pads on the printed circuit board and connected to the first and second input lines, and one output pad on the printed circuit board and connected to the one output line.

9. The LED assembly according to claim 8, wherein each of the first and second input pads and the one output pad is connected to an LED driving circuit through a cable.

10. A liquid crystal display device, comprising:
a liquid crystal panel;
a backlight unit for projecting light on the liquid crystal panel and including a light emitting diode (LED) assembly, the LED assembly including:
a printed circuit board;
first and second LED arrays arranged on the printed circuit board and each including a plurality of LEDs, wherein the LEDs in each of the first and second LED array are connected to each other in series, and an output terminal of the first LED array faces an output terminal of the second LED array such that both the output terminal of the first LED array and the output terminal of the second LED array are disposed between an input terminal of the first LED array and an input terminal of the second LED array;
a first input line connected to an input terminal of the first LED array;
a second input line connected to an input terminal of the second LED array; and
one output line connected to the output terminal of the first LED array and the output terminal of the second LED array,
a bottom frame under the backlight unit;
a main frame surrounding the liquid crystal panel; and
a top frame surrounding an edge of the liquid crystal panel,
wherein the first input line, the second input line and the one output line are disposed at one side of the printed circuit board with respect to the LEDs.

11. The liquid crystal display device according to claim 10, further comprising third and fourth LED arrays arranged on the printed circuit board, wherein an output terminal of the third LED array faces an output terminal of the fourth LED array.

12. The liquid crystal display device according to claim 11, wherein an input terminal of the third LED array face the input terminal of the second LED array.

13. The liquid crystal display device according to claim 11, further comprising;
a third input line connected to an input terminal of the third LED array;
a fourth input line connected to an input terminal of the fourth LED array; and
another one output line connected to the output terminal of the third LED array and the output terminal of the fourth LED array.

14. The liquid crystal display device according to claim 13, wherein the third input line, the fourth input line and the another one output line are disposed at the one side of the printed circuit board.

15. The liquid crystal display device according to claim 13, further comprising first and second input pads on the printed circuit board and connected to the third and fourth input lines, and one output pad on the printed circuit board and connected to the another one output line.

16. The liquid crystal display device according to claim 15, wherein each of the first and second input pads and the one output pad is connected to an LED driving circuit through a cable.

17. The liquid crystal display according to claim 10, further comprising first and second input pads on the printed circuit board and connected to the first and second input lines, and one output pad on the printed circuit board and connected to the one output line.

18. The liquid crystal display according to claim 17, wherein each of the first and second input pads and the one output pad is connected to an LED driving circuit through a cable.

19. The liquid crystal display according to claim 10, wherein the backlight unit further includes a light guide plate at one side of the LEDs, a reflective sheet under the light guide plate, and an optical sheet on the light guide plate.

* * * * *